United States Patent [19]

Pernicano

[11] Patent Number: 4,657,803
[45] Date of Patent: Apr. 14, 1987

[54] STRETCH TRANSFER AND METHOD OF MAKING SAME

[76] Inventor: Vincent S. Pernicano, 2833 Railroad St., Boyne Falls, Mich. 49713

[21] Appl. No.: 492,948

[22] Filed: May 9, 1983

[51] Int. Cl.[4] .......................... B32B 3/18; B32B 5/16; C09J 7/02
[52] U.S. Cl. .................................... 428/200; 156/230; 428/201; 428/207; 428/349; 428/354; 428/355; 428/914
[58] Field of Search ............... 428/195, 914, 343, 349, 428/354, 355, 200, 201, 207; 156/230; 350/98

[56] References Cited

U.S. PATENT DOCUMENTS

| | | | |
|---|---|---|---|
| 4,142,929 | 3/1979 | Otomine et al. | 428/914 X |
| 4,248,500 | 2/1981 | Pernicano et al. | 350/98 |
| 4,367,312 | 1/1983 | Bontinck et al. | 428/520 X |

Primary Examiner—Thomas J. Herbert
Attorney, Agent, or Firm—Harold W. Milton, Jr.

[57] ABSTRACT

A heat transfer sheeting combination of the type for being applied onto a fibrous article (10) to imprint a design thereon including a substrate (12) and a design coating (14) disposed on the substrate (12). An adhesive layer (24) is disposed on the design coating (14) and is responsive to heat and pressure for adhesively securing the design coating (14) to the article (10) and is characterized by the adhesive layer being transformable in response to the application of heat and pressure to a stretchable adhesive layer. A method of manufacturing the heat transfer includes the steps of applying a design coating (14) over a substrate (12) and applying an adhesive layer (24) being transformable after the application of heat and pressure to a stretchable adhesive layer over the design coating (14).

30 Claims, 3 Drawing Figures

STRETCH TRANSFER AND METHOD OF MAKING SAME

TECHNICAL FIELD

The instant invention relates to heat transfer sheeting of the type including a design coating disposed on a substrate and an adhesive outer layer. Heat applied to the substrate side of the sheeting transfers the design coating to an article, the adhesive securing the design coating to the article.

BACKGROUND ART

Heat transfers are an affective means of indicating a trademark or other message on a garment. It is desirable to apply such transfers onto various types of materials. In particular uses, it is necessary to apply a transfer to a stretchable material. An example of a heat transfer combination is disclosed in U.S. Pat. No. 4,248,500 to Pernicano et al. A stretchable heat transfer including an adhesive comprising essentially polyvinyl acetate is disclosed in the U.S. Pat. No. 4,142,929 to Otomine et al.

The instant invention provides an improved stretchable heat transfer and a method for manufacturing the same. Once applied onto a stretchable material of a garment, the heat transfer made in accordance with the instant invention stretches with the material.

SUMMARY OF THE INVENTION

According to the present invention, there is provided a heat transfer sheeting combination of the type for being applied onto a fibrous article to imprint a design thereon, the combination including a substrate and a design coating disposed on the substrate. An adhesive layer is disposed on the design coating and is responsive to heat and pressure for adhesively securing the design coating to the article. The combination is characterized by the adhesive layer comprising essentially styrene block copolymer and being transformable in response to the application of heat and pressure to a stretchable adhesive layer. The instant invention further provides a method of making the heat transfer sheeting combination comprising the steps of applying a design coating over a substrate and applying over the design coating an adhesive layer comprising essentially styrene block copolymer, the adhesive layer being stretchable after the application of heat and pressure and transforming the adhesive layer with heat and pressure to bond the design coating to an article as a stretchable heat transfer.

BRIEF DESCRIPTION OF THE DRAWINGS

An embodiment of a heat transfer sheeting combination constructed in accordance with the present invention will now be described by way of example only, with reference to the accompanying drawings in which.

DETAILED DESCRIPTION OF THE DRAWINGS

Figure 1:
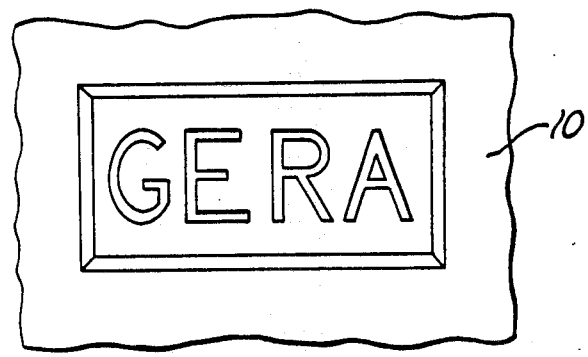
FIG. 1 is a heat transfer sheeting combination made in accordance with the subject invention and applied to an article.

FIG. 1 shows a heat transfer sheeting combination made in accordance with the subject invention applied to an article 10, such as a stretchable fabric, making up an article of clothing. The heat transfer portion is defined by the letters GERA and the surrounding rectangular border.

Figure 2:
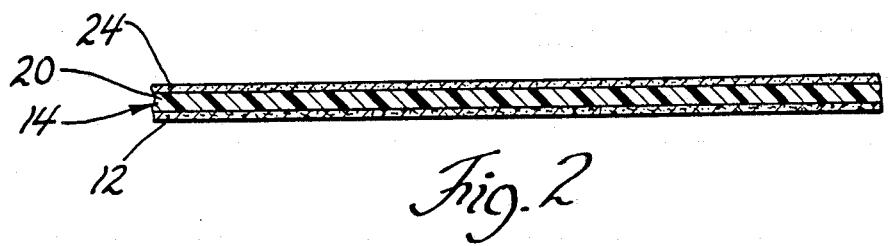
FIG. 2 is an enlarged fragmentary cross-sectional view of one embodiment of the instant invention.
Figure 3:
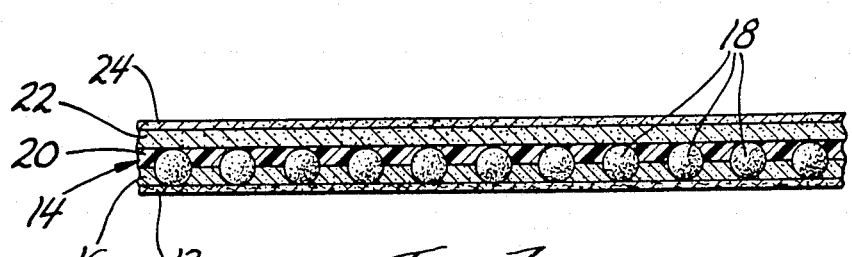
FIG. 3 is an enlarged fragmentary cross-sectional view of a second embodiment of a heat transfer sheeting combination constructed in accordance with the instant invention.

Two embodiments of the subject heat transfer sheeting combination are shown in cross section in FIGS. 2 and 3, respectively in the configuration of transfers before they are applied to an article. Like numbers are used to indicate like or similar components in each embodiment.

The heat transfer sheeting includes a substrate 12. The substrate 12 may comprise a layer fibrous material. The fibrous material may be absorbent, the function of which will be described below.

The substrate 12 may include other layers for the purpose of either stabilizing the substrate or protecting the substrate from environmental contamination such as moisture.

A design coating generally indicated at 14, is disposed on the substrate 12. As shown in FIG. 3, the design coating includes a particle carrier layer 16 disposed in a predetermined pattern over the substrate 12 and a layer of reflective particles 18 being partially disposed or embedded in the carrier layer 16. The carrier layer 16 may comprise a mixture of tack wax and solvent, i.e., mineral spirits and, preferably oleum. The carrier layer 16 is responsive to heat for melting and being absorbed by the absorbent fibrous substrate layer 12 when the transfer is being applied to an article 10. The reflective particles 18 may be spherical glass beads 18 which are partially disposed or embedded within the carrier layer 16. The beads 18 are in engagement with the substrate 12 and have portions disposed over the carrier layer 16.

The design coating 14 further includes a water based acrylic color ink 20 disposed over the reflective particles 18. A white back coat 22 is disposed over the acrylic color ink 20. The white back coat 22 includes an phenolic acrylic white ink. Alternatively, a single acrylic color coat 18 may be used alone.

As shown in FIG. 2, the transfer may only include an acrylic color ink 20 disposed over the substrate 12. Several layers of ink may be disposed upon each other to provide a desired multicolor effect. Alternatively, a lithographic ink may be used. A white backing coat may be disposed over the color ink layer 20.

An adhesive layer 24 is disposed over the design coating 14 and is responsive to heat and pressure for adhesively securing the design coating 14 to the article 10. The heat transfer sheeting combination is characterized by the adhesive layer comprising essentially styrene block copolymer and being transformable after the application of heat and pressure to a stretchable adhesive. In other words, the adhesive layer is made of a chemical composition such that upon application of heat and pressure to apply the transfer to an article of manufacture, the styrene block copolymer melts and then solidifies to bond the design coating to the article. Essentially, a stretchable transfer is formed on the article of manufacture. Said another way, the adhesive layer is responsive to heat and pressure to become stretchable. The styrene block copolymer is a thermoplastic which can be melted and then solidified so as to bond the design coating (14) to an article. The article of manufacture would comprise a fibrous substrate and the stretchable heat transfer adhesively secured to the substrate, as shown in FIG 1. Thusly, the instant invention is particularly well suited to be applied to a stretchable fibrous article 10 such as nylon-lycra garments to imprint a design thereon. The design coating 14 which would be adhesively secured to the adhesive layer 24 which, in turn, would be adhesively secured to an article 10, would be stretchable in its entirety with the article 10.

The adhesive layer 24 comprises essentially styrene copolymer, and specifically, a mixture of a styrene block copolymer and an organic solvent. The mixture further includes tackifying means for enhancing the adhesive quality of the mixture, the tackifying means comprising at least one tackifying resin. The mixture further includes stabilizing means for protecting the mixture from oxygen, ozone, and ultraviolet-ray-induced degradation. A preferred composition includes stabilizing means comprising a substituted benzotriazole. The styrene copolymer is a styrene-isoprene-styrene polymer.

An adhesive layer 24 comprehended by the subject invention can be made by mixing the following, by weight:
(1) 4 to 12 parts styrene block copolymer;
(2) 8 to 24 parts organic solvent;
(3) 3 to 7 parts tackifying resin; and
(4) 0.8 to 2.0 ounces of oxygen, ozone and ultraviolet stabilizer per pound of the mixture.

An example of an adhesive layer made in accordance with the instant invention includes by weight:
(1) 8 parts styrene block copolymer (styrene-isoprene-styrene);
(2) 16 parts organic solvent;
(3) 5 parts tackifying resin;
(4) 1.474 ounces of oxygen ozone and ultraviolet ray stabilizer per pound of mixture.

Preferably, D-1107 styrene block copolymer, manufactured by Kraton is used. A preferred organic solvent is D-100 solvent manufactured by Barton. The Barton solvent evaporates slower than toluoul and is less toxic and slower drying, yet provides good solubility. Krystaltex is the preferred tackifying resin and is manufactured by Hercules Chemical. Krystaltex is a modified polar resin. Pexalyn A 500 or A 600 tackifying resin may be used in equal amounts as the Krystaltex. The combination of resins enhance the adhesive quality of the adhesive layer and prevent delaminating. Tinuvin, manufactured by Ciba Gegi and Ingernox 1010 are used in equal amounts as the stabilizing means of the instant invention.

The actual ratio of solvent to styrene block copolymer can be varied in accordance with the desired thickness of the adhesive to be applied to the transfer. If the adhesive is to be applied by a silk screen process, then a thinner adhesive is desired and a greater ratio of solvent to styrene block copolymer is used. Other applications, such as by roller, require a thicker adhesive. Once applied, it may also be desirable to apply a dust, such as talc, over the adhesive as a protective layer thereover.

Alternatively, the adhesive layer may be a powder including particulate styrene block copolymer. More specifically, the styrene block copolymer is frozen and then ground into a particulate material or powder. The tackifying resin, and stabilizing means are added to the ground styrene block copolymer and the adhesive is applied as a powder over the design coating. In other words, the powder adhesive is applied over the wet ink design coating layer 14 so as to adhere thereto.

An adhesive composition comprehended by the subject invention can be made by mixing the following, by weight:
(1) 4 to 12 parts particulate styrene block copolymer;
(2) 3 to 7 parts tackifying resin; and
(3) 2 to 4 ounces of oxygen, ozone and ultraviolet ray stabilizer per pound of mixture.

An example of an adhesive powder made in accordance with the instant invention includes, by weight:
(1) 8 parts particulate styrene block copolymer (styrene-isoprene-styrene);
(2) 5 parts tackifying resin; and
(3) 3.25 ounces of oxygen, ozone and ultraviolet ray stabilizer per pound of mixture.

Alternatively, the design coating 14 may comprise a single layer of acrylic water based ink disposed upon the substrate 12 in a predetermined pattern. The adhesive layer 24 is disposed over the ink in the same predetermined pattern. A second particulate adhesive comprising essentially styrene block copolymer is disposed over the adhesive layer 24 in the same predetermined pattern.

The second particulate adhesive comprehended by the subject invention can be made by mixing the following, by weight:
(1) 8 parts styrene block copolymer,
(2) 2.5 parts tackifying resin, and
(3) 0.6% of the weight of the total mixture of oxygen, ozone, and ultraviolet rays stabilizer.

The specific compounds used may be the same compounds as those discussed above.

This composition of the subject invention requires only one layer of acrylic ink, reducing the number of steps and cost of prior art printing processes which required several layers of ink. A finer screen giving a cleaner printed edge may be used to silk-screen the adhesive over the design coating 14. The adhesive layer may be printed in exact registration over the acrylic layer with virtually no adhesive going beyond the acrylic layer. Prior art methods requires a one-sixteenth inch oversize print of the adhesive layer over the colored ink. The overlay of adhesive was very visible and, therefore, undesirable in the finished product. The layer of particulate adhesive gives the primary adhesive layer the needed additional adhesive to make the transfer adhere well and stretch well.

An alternative method of making the transfer includes the steps of applying a layer of acrylic water-based ink over the substrate 12 to form the design coating 14 in a predetermined pattern and drying the ink. A wet layer of the adhesive mixture, as previously formulated, is applied over the ink in the same predetermined pattern. This may be done by silk-screening the adhesive mixture over the dried ink. Before the adhesive was dried, a powder consisting essentially, by weight, of 8 parts particulate styrene block copolymer, 2.5 parts tackifying resin, and 0.6% of the weight of the total mixture of oxygen, ozone, and ultraviolet ray stabilizer, is dusted over the printed adhesive mixture. Since only one layer of acrylic ink is required, this method reduces the process by one printing step.

Thusly, the instant invention provides a novel adhesive composition of the type responsive to heat and pressure for adhesively securing a design coating 14 of the heat transfer sheeting onto a fibrous article 10. The composition preferably comprises styrene block copolymer and organic solvent. Alternatively, the adhesive composition may be a powder comprising essentially a cryogenically ground styrene block copolymer.

The instant invention provides a method of making the heat transfer sheeting combination including the steps of applying a design coating 14 over a substrate 12 and applying an adhesive layer 24 comprising essentially styrene block copolymer and being stretchable after the application of heat and pressure over the design coating 14. The styrene block copolymer may be ground to be applied as a powder or dissolved in an organic solvent and applied as a paste or liquid over the design coating 14.

A preferred method of making the transfer includes the steps of silkscreening a first design coating 14 over the substrate 12 and drying the first design coating 14. A second design coating 14 is silkscreened over the first design coating 14 and the second design coating is dried. An adhesive layer 24 is printed over the second design coating and air-dried. An inert powder is dusted over the adhesive coating. The insert powder may be a talc.

The transfer may be applied to an article 10 by applying the design coating 14 with the adhesive layer 24 thereon against the article 10 and applying heat and pressure to the substrate 12 to melt the adhesive layer to bond the design coating 14 to the article 10 as a stretchable transfer once the adhesive layer solidifies. The substrate 12 is removed from the bonded design coating 14 to leave the design coating adhesively secured to the article 10 by the adhesive layer 24. Thusly, the instant invention provides an article manufacture comprising a fibrous substrate and characterized by a stretchable heat transfer adhesively secured to the substrate. Unlike prior art heat transfers, the transfer made in accordance with the instant invention stretches as the fabric to which it is secured stretches. Such a transfer is well suited for application on stretchable garments such as swim suits, T-shirts, and sweat shirt material as well as sweaters, socks and dancewear. Further, an adhesive, made in accordance with the instant invention, will adhere to nylon-lycra.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the instant invention may be practiced otherwise than as specifically described.

The embodiments of the invention which an exclusive property or privilege is claimed are defined as follows:

1. A heat transfer sheeting combination of the type for being applied onto a fibrous article (10) to imprint a design thereon, said combination comprising: a substrate (12); a design coating (14) disposed on said substrate (12); and an adhesive layer (24) disposed on said design coating (14) and being responsive to heat and pressure for adhesively securing said design coating (14) to the article (10) and characterized by said adhesive layer comprising essentially a styrene block copolymer and being transformable in response to the application of heat and pressure to a stretchable adhesive layer.

2. A combination as set forth in claim 1 including a mixture of said styrene block copolymer in an organic solvent.

3. A combination as set forth in claim 2 further characterized by said mixture including tackifying means for enhancing the adhesive quality of said mixture.

4. A combination as set forth in claim 3 further characterized by said tackifying means comprising at least one tackifying resin.

5. A combination as set forth in claim 2 further characterized by said mixture including stabilizing means for protecting said mixture from oxygen, ozone and ultraviolet-ray-induced degradation.

6. A combination as set forth in claim 5 further characterized by said stabilizing means including a substituted benzotriazole.

7. A combination as set forth in claim 1 further characterized by said styrene block copolymer being a styrene-isoprene-styrene polymer.

8. A combination as set forth in claim 1 further characterized by said adhesive layer (24) including a mixture of, by weight:
   4-12 parts styrene block copolymer;
   8-24 parts organic solvent;
   3-7 parts tackifying resin, and
   0.8-2.0 ounces of oxygen, ozone and ultraviolet ray stabilizer per pound of said mixture.

9. A combination as set forth in claim 1 further characterized by said adhesive layer including a mixture of, by weight:
   8 parts styrene block copolymer (styrene-isoprene-styrene);
   16 parts organic solvent;
   5 parts tackifying resin; and
   1.474 ounces oxygen, ozone and ultraviolet ray stabilizer per pound of said mixture.

10. A combination as set forth in claim 1 further characterized by said adhesive layer being a powder including a particulate styrene block copolymer.

11. A combination as set forth in claim 10 further characterized by said mixture including tackifying means for enhancing the adhesive quality of said mixture.

12. A combination as set forth in claim 11 further characterized by said tackifying means comprising at least one tackifying resin.

13. A combination as set forth in claim 10 further characterized by said mixture including stabilizing means for protecting said mixture from oxygen, ozone and ultraviolet-ray-induced degradation.

14. A combination as set forth in claim 13 further characterized by said stabilizing means including a substituted benzotriazole.

15. A combination as set forth in claim 10 further characterized by said styrene block copolymer being a styrene-isoprene-styrene polymer.

16. A combination as set forth in claim 10 further characterized by said powder including a mixture of, by weight:
   4-12 parts particulate styrene block copolymer;
   3-7 parts tackifying resin; and
   3 to 4 ounces of oxygen, ozone and ultraviolet ray stabilizer per pound of said mixture.

17. A combination as set forth in claim 10 further characterized by said powder including a mixture of, by weight:
   8 parts particulate styrene block copolymer (styrene-isoprene-styrene);

5 parts tackifying resin; and 3.25 ounces oxygen, ozone, ultraviolet ray stabilizer per pound of said mixture.

18. A combination as set forth in claim 1 further characterized by said substrate (12) including a fibrous material, said design coating (14) including a particle carrier layer (16) disposed in a predetermined pattern over said substrate (12) and a layer of reflective particles (18) partially disposed in said carrier layer (16) and an acrylic color ink (20) disposed between said reflective particles (18) and said adhesive layer (24) and a white backing coat (22) disposed between said acrylic color ink (18) and said adhesive layer (24).

19. A combination as set forth in claim 1 further characterized by including an acrylic color ink (20) and a white backing coat (22) disposed between said acrylic color ink (20) and said adhesive layer (24).

20. A combination as set forth in claim 1 further characterized by said design coating (14) including an acrylic water-based ink disposed upon said substrate (12) in a predetermined pattern, said adhesive layer (24) being disposed over said ink in said same predetermined pattern.

21. A combination as set forth in claim 20 further characterized by including a second particulate adhesive comprising essentially said styrene block copolymer disposed over said adhesive layer (24) in said predetermined pattern.

22. A combination as set forth in claim 21 further characterized by said adhesive layer (24) including a mixture of, by weight:
   4–12 parts styrene block copolymer;
   8–24 parts organic solvent;
   3–7 parts tackifying resin, and
   0.8–2.0 ounces of oxygen, ozone and ultraviolet ray stabilizer per pound of said mixture.

23. A combination as set forth in claim 21 further characterized by said adhesive layer including a mixture of, by weight:
   8 parts styrene block copolymer (styrene-isoprene-styrene);
   16 parts organic solvent;
   5 parts tackifying resin; and
   1.474 ounces oxygen, ozone and ultraviolet ray stabilizer per pound of said mixture.

24. A combination as set forth in claim 21 further characterized by said second particulate adhesive including a mixture of, by weight:
   8 parts particulate styrene block copolymer,
   2.5 parts tackifying resin, and
   0.6% of the weight of the total mixture of oxygen, ozone and ultraviolet ray stabilizer.

25. An article of manufacture (10) comprising: a fibrous substrate and stretchable heat transfer adhesively secured to said substrate including a stretchable adhesive layer (24) secured to said substrate and a design coating (14) adhesively secured over said adhesive layer (24) and characterized by said adhesive layer (24) being a mixture essentially comprising a heat and pressure treated styrene block copolymer.

26. An article as set forth in claim 25 further characterized by said mixture including tackifying means for enhancing the adhesive quality of said mixture.

27. An article as set forth in claim 26 further characterized by said tackifying means comprising at least one tackifying resin.

28. An article as set forth in claim 26 further characterized by said mixture including stabilizing means for protecting said mixture from oxygen, ozone and ultraviolet-ray-induced degradation.

29. An article as set forth in claim 28 further characterized by said stabilizing means including a substituted benzotriazole.

30. An article as set forth in claim 25 further characterized by said styrene block copolymer being a styrene-isoprene-styrene polymer.

* * * * *